US009984009B2

(12) United States Patent
Ahmed et al.

(10) Patent No.: US 9,984,009 B2
(45) Date of Patent: May 29, 2018

(54) DYNAMIC CONTAINERIZED SYSTEM MEMORY PROTECTION FOR LOW-ENERGY MCUS

(71) Applicant: SILICON LABORATORIES INC., Austin, TX (US)

(72) Inventors: Sebastian Ahmed, Austin, TX (US); Thomas S. David, Austin, TX (US); Marius Grannaes, Oslo (NO)

(73) Assignee: SILICON LABORATORIES INC., Austin, TX (US)

( * ) Notice: Subject to any disclaimer, the term of this patent is extended or adjusted under 35 U.S.C. 154(b) by 150 days.

(21) Appl. No.: 15/008,650

(22) Filed: Jan. 28, 2016

(65) Prior Publication Data
US 2017/0220489 A1 Aug. 3, 2017

(51) Int. Cl.
G06F 13/36 (2006.01)
G06F 12/14 (2006.01)
G06F 13/28 (2006.01)
G06F 13/42 (2006.01)

(52) U.S. Cl.
CPC .......... *G06F 12/1491* (2013.01); *G06F 13/28* (2013.01); *G06F 13/4282* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 6,157,955 A * | 12/2000 | Narad | ...................... | H04L 45/16 709/228 |
| 2006/0174056 A1* | 8/2006 | Lambert | .................. | G06F 21/78 711/103 |
| 2011/0219150 A1* | 9/2011 | Piccirillo | ................ | G06F 13/28 710/24 |
| 2013/0318276 A1* | 11/2013 | Dalal | ...................... | G06F 13/16 710/308 |

(Continued)

OTHER PUBLICATIONS

"ARM® CoreLink™ TZC-400 TrustZone Address Space Controller" downloaded on Oct. 30, 2017 from http://infocenter.arm.com/help/topic/com.arm.doc.100325_0001_02_en/arm_corelink_tzc400_trustzone_address_space_controller_trm_100325_0001_02_en.pdf pp. 1-80.

(Continued)

*Primary Examiner* — Michael Sun
(74) *Attorney, Agent, or Firm* — Gary Stanford

(57) ABSTRACT

A processor, such as a low-cost microcontroller unit, uses a DMA controller to facilitate direct memory transactions between hardware subsystems independently of the CPU. To enable those transactions to be carried out security, gateways are provided to the DMA controller and peripheral bridge. The gateways, which have access to multiple access policies, switch between those policies depending on a hardware context and/or subcontext, such as the bus master originating the transaction and/or the DMA channel associated with the transaction. The gateways are operable to administer those policies independently of the CPU. In various implementations, gateways are provided for the DMA controller, the peripheral bridge, and/or individual peripherals. The processor is able to support secure, fully containerized operations involving its peripherals without constant CPU intervention.

13 Claims, 12 Drawing Sheets

(56) References Cited

U.S. PATENT DOCUMENTS

| | | | | |
|---|---|---|---|---|
| 2013/0318277 A1* | 11/2013 | Dalal | ................. | G06F 13/1652 |
| | | | | 710/308 |
| 2014/0304475 A1* | 10/2014 | Ramanujan | ......... | G06F 12/0895 |
| | | | | 711/128 |
| 2015/0242233 A1* | 8/2015 | Brewerton | .......... | G06F 9/30043 |
| | | | | 710/308 |

OTHER PUBLICATIONS

"CoreLink TrustZone Address Space Controller TZC-380" downloaded on Oct. 30, 2017 from http://infocenter.arm.com/help/topic/com.arm.doc.ddi0431c/DDI0431C_tzasc_tzc380_r0p1_trm.pdf pp. 1-82.

"ARM® PrimeCell Infrastructure AMBA™ 3 AXI™ TrustZone™ Memory Adapter (BP141)" downloaded on Oct. 30, 2017 from http://infocenter.arm.com/help/topic/com.arm.doc.dto0015a/DTO0015_primecell_infrastructure_amba3_tzpc_bp147_to.pdf pp. 1-12.

"ARM® PrimeCell Infrastructure AMBA™ 3 AXI™ TrustZone™ Memory Adapter (BP147)" downloaded on Oct. 30, 2017 from http://infocenter.arm.com/help/topic/com.arm.doc.dto0015a/DTO0015_primecell_infrastructure_amba3_tzpc_bp147_to.pdf pp. 1-18.

* cited by examiner

| 196 | 186 | 180 | 182 |
|---|---|---|---|
| HW Context 0 | HW SubContext 0 | Memory Region 0 | Security Attributes |
| | | Memory Region 1 | Security Attributes |
| | | ⋮ | |
| | | Memory Region n | Security Attributes |
| | HW SubContext 1 | Memory Region 0 | Security Attributes |
| | | Memory Region 1 | Security Attributes |
| | | ⋮ | |
| | | Memory Region n | Security Attributes |
| | ⋮ | | |
| | HW SubContext P | Memory Region 0 | Security Attributes |
| | | Memory Region 1 | Security Attributes |
| | | ⋮ | |
| | | Memory Region n | Security Attributes |
| HW Context 1 | HW SubContext 0 | Memory Region 0 | Security Attributes |
| | | Memory Region 1 | Security Attributes |
| | | ⋮ | |
| | | Memory Region n | Security Attributes |
| | HW SubContext 1 | Memory Region 0 | Security Attributes |
| | | Memory Region 1 | Security Attributes |
| | | ⋮ | |
| | | Memory Region n | Security Attributes |
| ⋮ | | | |
| HW Context M | HW SubContext 0 | Memory Region 0 | Security Attributes |
| | | Memory Region 1 | Security Attributes |
| | | ⋮ | |
| | | Memory Region n | Security Attributes |

| 196 | 186 | 180 | 182 |
|---|---|---|---|
| HW Context 0 | HW SubContext 0 | Register Region 0 | Security Attributes |
| | | Register Region 1 | Security Attributes |
| | | ⋮ | |
| | | Register Region n | Security Attributes |
| | HW SubContext 1 | Register Region 0 | Security Attributes |
| | | Register Region 1 | Security Attributes |
| | | ⋮ | |
| | | Register Region n | Security Attributes |
| | ⋮ | | |
| | HW SubContext P | Register Region 0 | Security Attributes |
| | | Register Region 1 | Security Attributes |
| | | ⋮ | |
| | | Register Region n | Security Attributes |
| HW Context 1 | HW SubContext 0 | Register Region 0 | Security Attributes |
| | | Register Region 1 | Security Attributes |
| | | ⋮ | |
| | | Register Region n | Security Attributes |
| | HW SubContext 1 | Register Region 0 | Security Attributes |
| | | Register Region 1 | Security Attributes |
| | | ⋮ | |
| | | Register Region n | Security Attributes |
| ⋮ | | | |
| HW Context M | HW SubContext 0 | Register Region 0 | Security Attributes |
| | | Register Region 1 | Security Attributes |
| | | ⋮ | |
| | | Register Region n | Security Attributes |

DYNAMIC CONTAINERIZED SYSTEM MEMORY PROTECTION FOR LOW-ENERGY MCUS

FIELD OF THE INVENTION

This invention relates to the field of memory protection generally in microprocessors and particularly in low-power microcontroller units.

BACKGROUND

This background is presented for the purpose of generally describing the context of the disclosure. To the extent that the background includes the work of the presently named elements and other elements that do not qualify as prior art at the time of filing, such description is neither expressly nor impliedly admitted as prior art against the present disclosure.

Many processor types, including many microcontroller units (MCUs), contain bus masters/accelerators that can perform memory access independent of the processor. One example is a direct memory access (DMA) controller. A DMA controller is a shared system resource that enables other hardware subsystems, such as sensors (which are frequently employed by MCUs), to access system memory without intervention by the CPU. Indeed, a DMA can facilitate memory transactions between a sensor and system memory while the CPU is asleep. This advantageously enables MCUs to consume very low amounts of power while collecting sensor data. This is particularly important for MCUs, such as a growing array of internet-of-things (IOT) devices, that are supplied with battery power or other low-energy power supplies.

The ability of a DMA controller to facilitate memory transactions asynchronously of the CPU, however, presents security challenges when the CPU is asleep. Without the CPU available to administer an access control policy (or access mask), a potential exists for security breaches through the sensor. Because all channels have a full view of available DMA memory, it is not possible to containerize the individual DMA channels in terms of their view of system memory. Also, an attacker could launch a low-level denial of service attack by flooding the peripheral bus with constant requests through a compromised sensor input. This could throttle the peripheral bus's arbitration and scheduling mechanism enough to prevent the processor from servicing or controlling another peripheral, for example, a mechanical actuator. Or it could thwart other critical memory transactions—for example, a camera feed—from occurring.

One possible solution is to interrupt the CPU every time a peripheral or other hardware subsystem attempts to use the DMA. Once awoken, the CPU can block any memory access request that lacks the appropriate security attributes. But this defeats the advantage discussed above—enabling the CPU to sleep while the processor collects sensor data. The CPU cannot stay asleep as DMA operations are conducted. Another potential solution would be to require the RTOS to sanitize the DMA operation programming. This becomes a challenge for DMA operations that utilize complex programming models such as command linked-lists stored in system memory. The foregoing solutions would also require a large software overhead/intervention and greatly limit the power efficiency, performance and functionality of the processor.

SUMMARY OF THE INVENTION

This summary is provided to introduce subject matter that is further described below in the detailed description and drawings. Accordingly, this summary should not be considered to describe essential features nor used to limit the scope of the claimed subject matter.

Embodiments of a processor and method of using the same are described. Various hardware subsystems make or forward memory access requests while one or more non-CPU memory-addressable protection units (PU) autonomously allow or block those requests on the basis of access protection policies that are specific to the hardware subsystem making or forwarding that request.

BRIEF DESCRIPTION OF THE DRAWINGS

These and other objects, features, and advantages of the present invention will become better understood with regard to the following description, and accompanying drawings where:

FIG. 4 is a block diagram illustrating access control policy structure for a peripheral protection unit (PPU);

FIG. 6 is a block diagram illustrating access control policy structure for a register protection unit (RPU);

DETAILED DESCRIPTION

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The embodiments described below have particular value when applied to—but are not limited to—lower-energy microcontroller units (MCUs). A secure (protected) MCU application uses a hypervisor or real time operating system (RTOS) that is responsible for managing the various execution contexts in the system. As such, the RTOS itself forms a secure task context that typically has access to all system memory when active. The RTOS controls the switching of processor execution between various non-secure user task contexts. In one implementation, each of these user tasks has access to an independent sub-set of system memory. This protects system critical memory (e.g. the RTOS) from each user task, but also protects each user task from other user tasks (containerization). In a system which has two privilege/security levels, the RTOS masks out access to a given active user task by raising the protection unit (PU) security requirement to specific memory ranges. This view changes with each and every task context switch.

Figure 1:
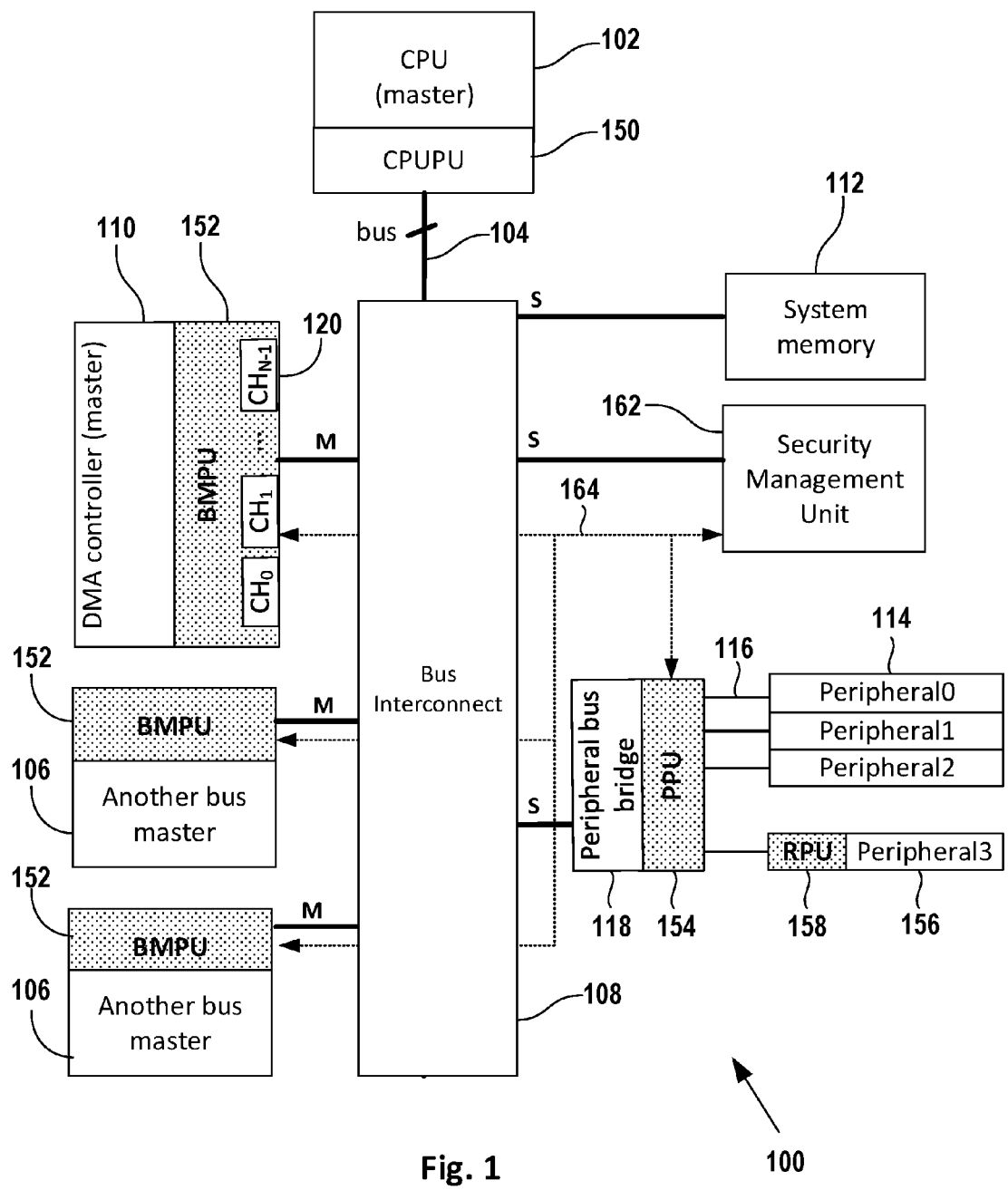
FIG. 1 is a block diagram illustrating a collection of processor, bus master, peripheral and register protection units.

FIG. 1 illustrates one embodiment of a processor 100 in accordance with the present invention. The processor 100 comprises a central processing unit (CPU) 102, a system bus 104, and a plurality of bus masters 106 and bus slaves connected to the bus 104 via a bus interconnect 108, also known as a bus matrix. The system bus 104 connects the CPU 102 to the system memory 112. The system bus 104 is configured to deliver memory access requests 160 (FIG. 6) between various hardware subsystems of the processor 100. In one implementation, the bus includes signal lines that carry hardware context and sub-context identifiers to identify a particular hardware subsystem or resource making a memory access request 160.

Bus masters 106 are devices that can initiate transactions on the bus 104. Examples include the CPU 102 and a direct memory access (DMA) controller 110. Bus slaves are devices that receive communications and commands from the bus 104 but do not initiate transactions on the bus 104. Examples of bus slaves are system memory (SMEM) 112 such as dynamic random access memory (DRAM) or static random access memory (SRAM), as well as memory-mapped peripherals 114 that control processes, receive inputs, or produce outputs. For peripherals 114 that are connected via a peripheral bus 116 to a peripheral bus bridge 118 coupled to the bus interconnect 108, the peripheral bus bridge 118 serves as the bus slave.

As noted above, a DMA controller 110 is one type of a bus master. DMA is a longstanding feature of computer systems allowing memory transactions to occur between certain hardware subsystems (especially peripherals) and the computer's main system memory, e.g., random access memory (RAM), without the assistance of the CPU. Absent the availability of DMA, memory transfers typically require the CPU to carry out a complete read or write input/output cycle. In personal computers, sound cards, video cards, and drives frequently make use of DMA. In microcontrollers (MCUs), sensors and control peripherals frequently make use of DMA.

A DMA controller 110 is typically equipped with multiple channels 120 to serve the DMA needs of multiple hardware subsystems. Each channel 120 is a programmable configuration or context of operation for the hardware subsystems that make use of the channel 120. The availability of multiple channels 120 enables a CPU 102 to preprogram multiple configurations. The DMA controller 110 can efficiently switch from one channel 120 to another through an arbitration and scheduling mechanism and algorithm.

As an alternative to a DMA controller 110, DMA may be carried out through bus mastering, in which a bus master 106 other than the CPU 102 initiates the transactions. The processor 100 is equipped with a bus arbitration scheme to prevent multiple bus masters 106 from attempting to drive the bus 104 simultaneously.

There may also be other, non-DMA bus masters 106, some having their own sub-contexts other than DMA channels 120. For example, in one implementation, an integrated graphics processor has multiple internal contexts, including one dedicated to graphics instructions and another for rendering textures.

In accordance with one embodiment of the present invention, various hardware subsystems are equipped with protection units (PUs). A PU is itself a hardware subsystem that acts as a gatekeeper by administering a set of access control policies to system memory and/or hardware subsystems accessed via system memory addresses (e.g., peripherals mapped to system memory). As elaborated further below, the scope of each access control policy (which can also be referred to as an access mask) is limited to a particular software or hardware context. In one embodiment, the processor 100 utilizes a multi-tiered system of PUs to administer access control policies characterized by different degrees of granularity.

The PU defines requirements for access to various defined regions in memory. The PU enforces access restrictions to such memory regions in accordance with the security attributes of the currently active processor execution thread/task (i.e., context). In order to facilitate execution of multiple non-secure contexts, the PU's view of memory is re-configured for each context switch. This can be viewed as a software controlled context switch.

Some processor types, such as a microcontroller unit (MCU), contain bus masters/accelerators that can perform memory access independent of the processor. One example is a direct memory access (DMA) controller. A DMA controller is a shared system resource that may be multi-purposed between a RTOS and various user tasks. Various DMA channels may be associated with the different software task contexts. The configuration of the DMA channels typically happens during the RTOS context or during specific user task context times. Once operational however, the DMA channels become active at times asynchronous to these SW contexts, and this creates challenges in administering an access control policy to the DMA accesses.

At a high-level tier, the CPU 102 is equipped with a PU referred to herein as the CPUPU 150, which some artisans would refer to as a memory protection unit. The CPUPU 150 defines requirements for access to various defined regions in memory. The CPUPU 150 enforces access restrictions to such memory regions in accordance with the security attributes of the currently active processor execution thread/task (i.e., context). In order to facilitate execution of multiple non-secure contexts, the CPUPU's 150 view of memory is re-configured for each context switch. This can be viewed as a software controlled context switch.

At a middle-level tier, most system bus masters 106, including the DMA controller 110, but not including the CPU 102, are equipped with a PU referred to herein as a bus master protection unit (BMPU) 152. BMPUs 152 are provided for hardware modules, such as secondary processors, that can generate memory accesses independent of the CPU 102. Some bus masters 106, for example a bus master that initializes the system during boot up (before the processor 100 begins executing instructions according to the processor's instruction set architecture) may not be equipped with a BMPU 152 assuming that they are not expected to be available for direct use by user software.

At a low-level tier, the peripheral bus bridge 118 is equipped with a PU referred to herein as a peripheral protection unit (PPU) 154. Finally, at an even lower-level tier, individual peripherals 156 that require internal delineation between secure/non-secure and/or privileged/non-privileged accesses may be equipped with PUs referred to herein as register protection units 158.

With respect to memory access requests 160 directed toward some targeted resources, such as a peripheral, the CPUPU and BMPU apply access control policies that are characterized by a coarse level of granularity. Memory access requests 160 that the CPUPU 150 or BMPU 152 allows through its coarse filter are then re-assessed by one or more downstream PUs whose access control policies are characterized by a relatively finer level of granularity. For example, a memory access request 160 from a bus master 106 device or CPU thread to a peripheral 114 equipped with a RPU 158 would be subject to access control policy administration initially from the CPUPU 150 or BMPU 152, subsequently from the PPU 154, and again from the RPU 158.

In one implementation, each PU is incorporated into its respective hardware subsystem. In accordance with its gatekeeping function, each PU blocks memory access requests 160 from reaching its respective hardware subsystem if the source and security attributes of the memory access request 160 do not meet the requirements of the PU's access control policy for the targeted memory region.

Also in one implementation, the RTOS programs a security management unit (SMU) 162, a configuration peripheral that houses all the configuration registers of all of the PUs other than the CPUPU 150. The SMU 162 is connected to config/status lines 164 that distribute the PU configurations to each of the BMPUs 152, the one or more PPUs 154, and to any RPUs 158. The config/status lines 164 also carry status information, including any fault information, from the PUs back to the SMU 162.

Figure 2:
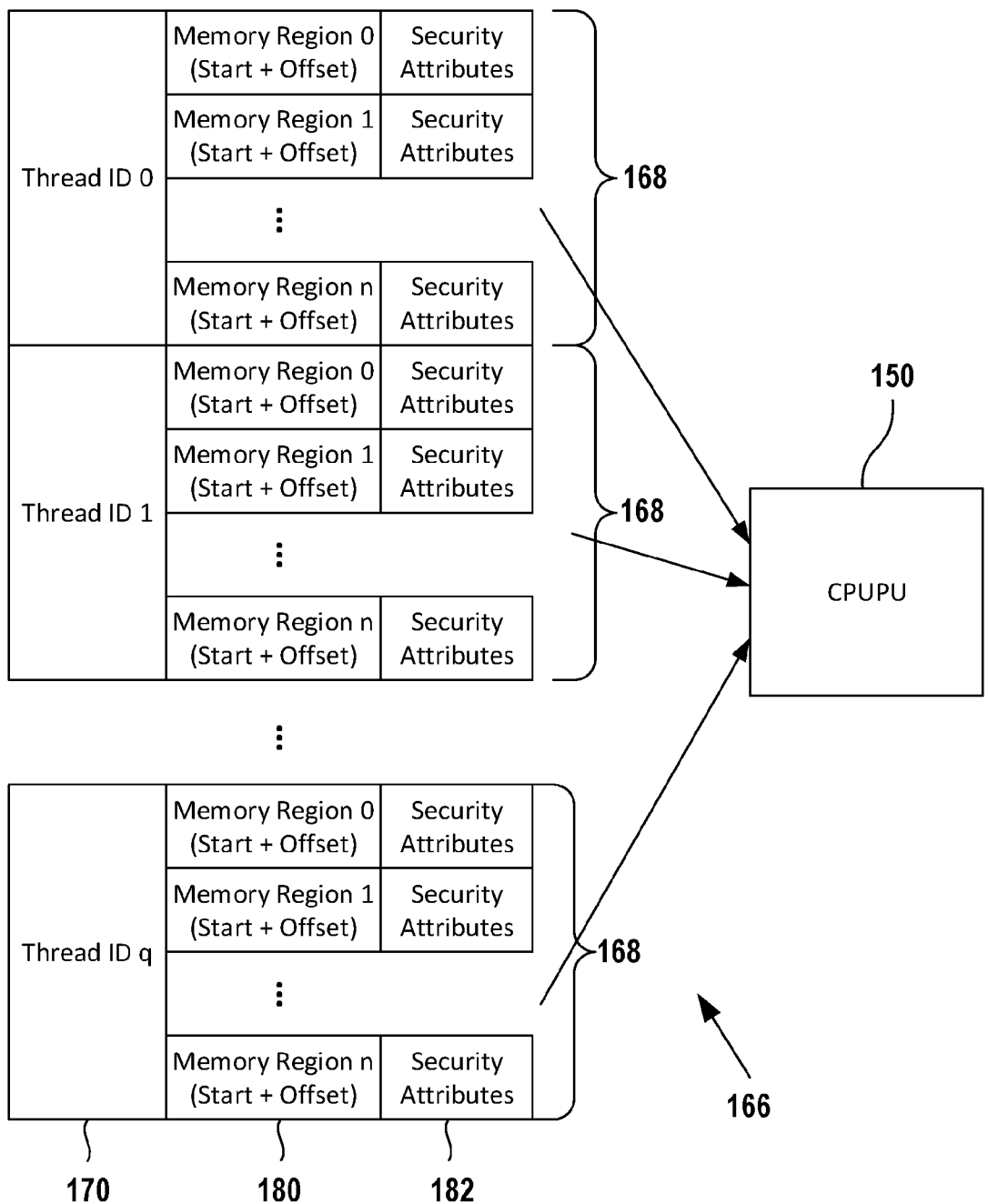
FIG. 2 is a block diagram illustrating access control policy structures for a central processing unit protection unit (CPUPU)

FIG. 2 illustrates an access control policy structure 166 for a CPUPU 102. According to one implementation, the CPU access control policy structure 166 comprises a plurality of access control policies 0 . . . q 168. A separate and distinct access control policy 168, each associated or tagged with a thread ID or other software context identifier 170, is provided for each thread or task. With each task switch from a preceding thread to a succeeding thread, the real time operating system (RTOS) causes the CPU 102 to index the CPU thread ID of the succeeding thread into the CPU access control policy structure 166 to select or retrieve the corresponding access control policy 168, which is then loaded into the CPUPU 150.

Each access control policy 168 provides or is associated with a plurality of memory regions 0 . . . q 180 identifying regions of addressable system memory (which may include peripherals mapped to system memory) and security attributes 182 associated with each identified memory region. The security attributes 182 may include whether access is limited to privileged and/or secure threads, whether access is read-only or not, and any other access restrictions supported by the processor's and operating system's architecture. A "security attribute" may encompass any attribute associated with a memory access request 160 used to control access to a targeted memory region 180.

In some embodiments, a CPU 102 is provided with a plurality of CPUPUs, at least one for each core, or in a hyperthreaded CPU, one CPUPU for each virtual core. Even more CPUPUs may be provided as part of hardware-based virtualization support.

Figure 3:
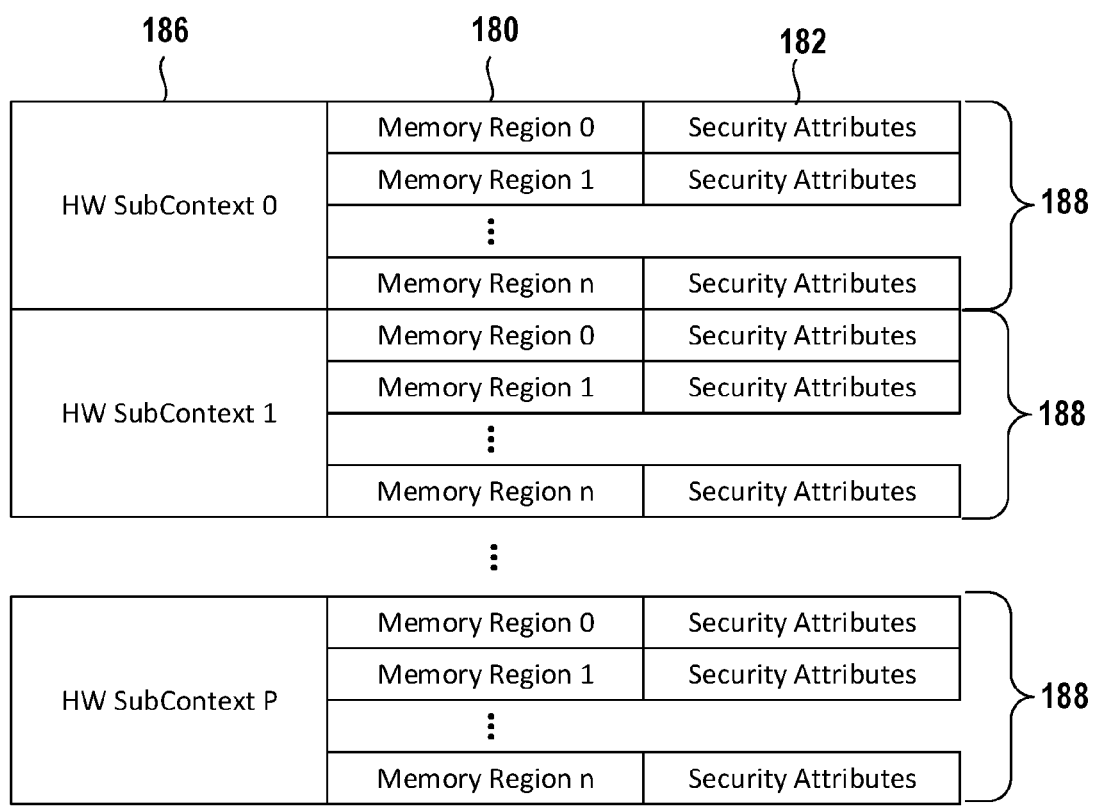
FIG. 3 is a block diagram illustrating an access control policy structure for a bus master protection unit (BMPU)

FIG. 3 is a block diagram illustrating an access control policy structure 184 for a BMPU 152 for a bus master 106, such as a DMA controller 110, that supports hardware sub-contexts 186. The BMPU 152 is connected, coupled, assigned, and/or incorporated in to the DMA 110 or other bus master 106.

The BMPU 152 provides a plurality of access control policies 0 . . . P 188 for all hardware sub-contexts 186 of the bus master 106 or 110 with which it is associated. In one implementation, the hardware sub-context 186 is identified by a signal—which in one very specific implementation is referred to as the MASTERSID 190 signal—that is carried on bus signal lines.

Advantageously, fine-grained support for hardware sub-contexts 186 such as DMA channels 120 enables the processor 100 to box out or containerize each channel 120 of a DMA controller 110, so that hardware subsystems utilizing channel 1, for example, cannot interfere with memory or peripherals controlled by channel 0. In this way, the BMPU 152 supports fully containerized DMA channel operations.

Like the CPUPU's access control policy structure 166, the BMPU's access control policy structure 184 provides or is associated with a plurality of memory regions 0 . . . n 180 identifying regions of addressable system memory (which may include peripherals mapped to system memory) and security attributes 182 associated therewith. But unlike the CPUPU's access control policy structure 166, the BMPU's access control policy structure 184 does not differentiate access control policies 188 by CPU thread. Instead, the BMPU's access control policy structure 184 differentiates policies 188 by hardware sub-context 186. Advantageously, by administering policies by DMA channel 120, a BMPU 152 for a DMA controller 110 operates to containerize DMA operations by giving each channel 120 a restricted view of system memory 112. The BMPU 152 can be programmed, for example, to prevent a peripheral 114 bound to channel 1 from accessing memory allocated to another peripheral 114 bound to channel 0.

In a BMPU 152 that serves a peripheral 114 or DMA controller 110, the memory regions corresponding to the peripherals 114 are usually configured to pass the corresponding memory access requests 160 through to the appropriate PPU 154. However, in some implementations, the BMPU 152 may have a channel 120 that blocks hardware subsystems from accessing the peripheral region entirely, preventing memory access requests 160 through that channel 120 from ever reaching the peripherals 114.

Memory regions corresponding to system memory 112, which is not protected by a dedicated PU, are configured with finely tuned security restrictions appropriate to the hardware sub-context 186. When the DMA controller 110 is presented with a memory request transaction 160, it provides the BMPU 152 its HW sub-context 186, which is the DMA channel number 120, and the BMPU selects (in real-time) the appropriate set of memory region information so it can enforce the specific memory access rights for that given DMA channel 120.

Figure 7:
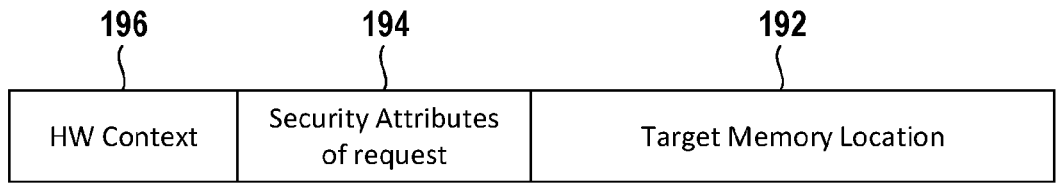
FIG. 7 is a block diagram detailing components of a memory access request.

The BMPU 152 indexes the HW sub-context 186 of the bus master 106 into the BMPU Access Control Policy Structure 184 to identify an access control policy 188 for that bus master 106. When the BMPU 152 processes a memory access request 160, the BMPU 152 compares the targeted memory location 192 and security attributes 194 of the access request 160 with the access control policy 188 and selectively allows or blocks the request 160. The BMPU 152 contains access control policies 188 for all sub-contexts of that master 106, which are identified and distinguished via a hardware context signal 196 (FIG. 7). The BMPU 152 administers its access control policies 198 automatically once it is configured. This is unlike the CPUPU 150, which is reprogrammed each time the CPU switches execution to the succeeding thread). It does the access control by comparing the region attributes to the bus transaction signals relating to those attributes, e.g. security (ARM HNONSEC signal) or privilege levels (ARM HPROT signals).

The BMPU 152 for a DMA controller 110 also sets the security attributes of a memory access request 160 passing through one of the DMA channels 120. In one example, the BMPU 152 is configured to mark an entire channel 120 as always privileged. That channel 120, moreover, is bound to the RTOS. After the RTOS issues a memory access request 160 to the DMA controller 110, the BMPU 152 asserts privilege and/or security lines on the system bus 104. Then, as the memory access request 160 works its way through the PPU 154 and/or the RPU 158, it has what is essentially an all-access pass.

FIG. 4 is a block diagram illustrating an access control policy structure 200 for a PPU 154. Before describing this structure 200, it should be noted that there may be different types of PPUs 154. For example, one type of PPU 154 serves a plurality of relatively low-speed peripherals, such as advanced peripheral bus (APB)-select based peripherals in an ARM-based implementation. Another type of PPU 154 serves a single, high-speed peripheral, such as an advanced high-speed bus (AHB) slave peripheral in an ARM-based implementation. It will be apparent that these differences may result in different access control policy structures 200.

Focusing in on the embodiment of FIG. 4, the PPU access control policy structure 200 is connected, coupled, assigned, and/or incorporated in to the peripheral bus bridge 118 or peripheral 156. The PPU access control policy structure 200 provides or is organized according to a plurality of hardware contexts 0 . . . M 196, one or more hardware sub-contexts 0 . . . P 186 associated with each hardware context 196, one or more memory regions 0 . . . n associated with each hardware sub-context 186, and a set of security attributes 182 associated with each memory region 0 . . . n 180. For example, one of the hardware contexts 196 could be a particular CPU core or virtual core. Another hardware context 196 could be a DMA controller 110, which has a plurality of channels 120, each channel 120 constituting a hardware sub-context 186. The scope of the PPU 154 extends to all of the bus masters 106 that have access to the set of peripherals 114 served by the PPU 154.

When presented with a memory access request 160, the PPU 154 indexes into the PPU Access Control Policy structure using the HW context and HW sub-context of the bus master, e.g., the DMA controller 110 and the peripheral assigned to a DMA channel. The PPU 154 then compares the targeted memory location 192 and security attributes 194 of the access request 160 with the access policy 200 and selectively allows or blocks the request 160.

Figure 5:
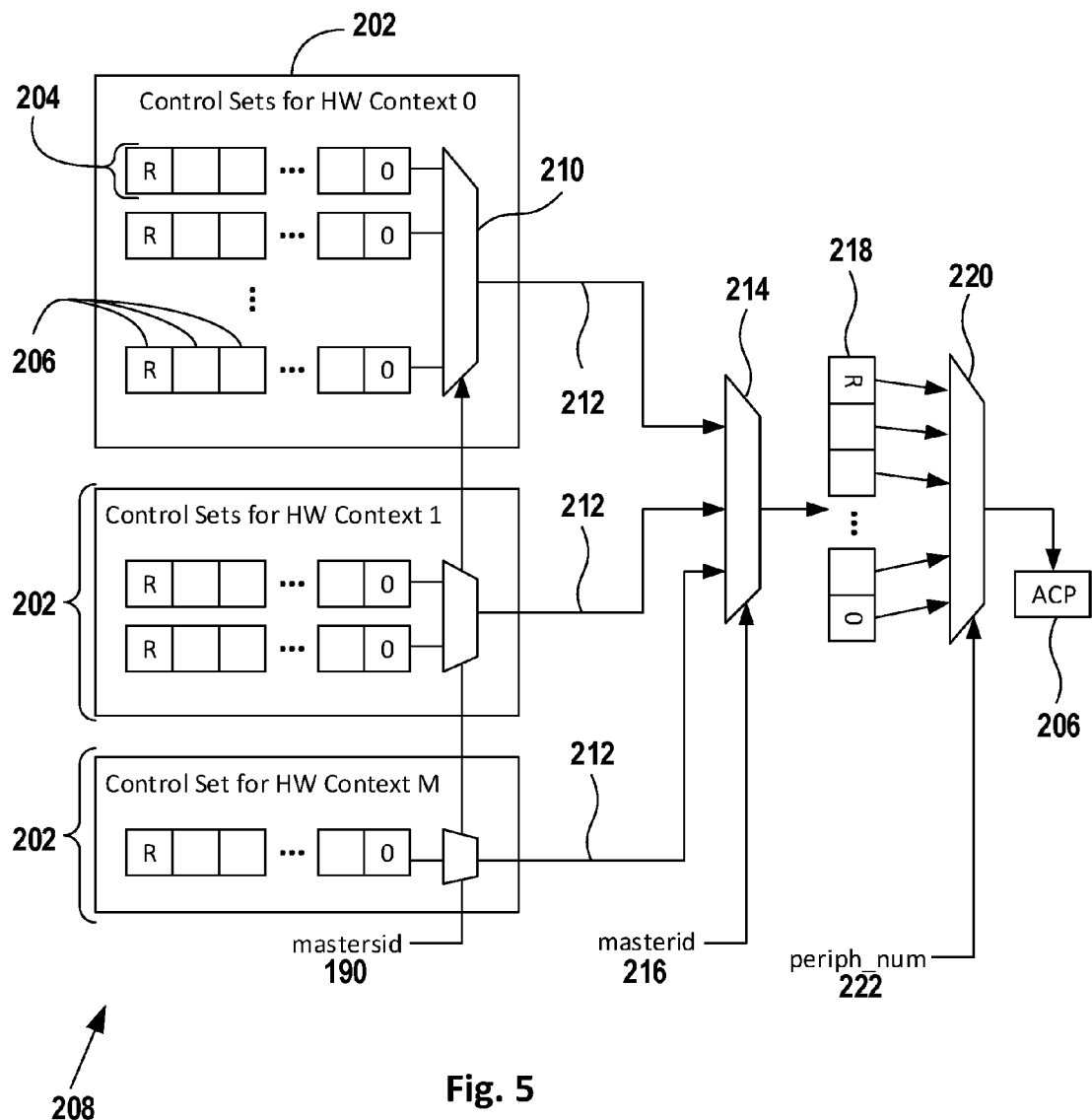
FIG. 5 is a block diagram illustrating a PPU control structure indexing topology.

FIG. 5 topologically illustrates one implementation of this indexing approach 208. FIG. 5 adds one more layer of complexity to FIG. 4 by taking into account the fact that a peripheral bus bridge 118 typically serves a plurality of peripherals 0 . . . R 114. Accordingly, the PPU access control policy structure 200 can be characterized as comprising a plurality of hardware-context-differentiated groups 0 . . . M 202 (hereinafter "control groups") of sub-context-differentiated sets 0 . . . P 204 (hereinafter "control sets") of peripheral-differentiated access control policies 0 . . . R 206. Viewed another way, access to a peripheral 114 is restricted by an access control policy 206 selected from an appropriate control set 204 selected from an appropriate control group 202, ensuring that the selected access control policy 206 corresponds to the appropriate peripheral 114, appropriate hardware sub-context 186, and appropriate hardware context 196.

According to the implementation of FIG. 5, a PPU 154 selects the appropriate access control policy 206 for a peripheral by using first level selection logic 210 (e.g., a multiplexer or a group of multiplexers) to select from each control group 202 a set of access control policies 204 that have been created for a given MASTERSID identifier 190. Each of the selected sets 212 (or addresses for each of the selected sets 212) are then fed into second level selection logic 214, which uses a MASTERID identifier 216 to select a single set of access control policies 218 (or an address thereof). The single selected set 218 comprises an individualized policy for each peripheral 114 served by the peripheral bus bridge 118. Finally, a third-level selection logic 220 uses a peripheral number 222 (carried on a peripheral select line) to select an appropriate access control policy 206 (or address thereof) from the single selected set 218. The PPU 154 then applies the selected access control policy 206 to block or allow the memory access request 160.

It will be understood that there are many equivalent forms of logic. For example, the peripheral number 222 could be used as the first-level selection logic 210, and the hardware sub-context 186 could be used as the third-level selection logic 220. In one embodiment, each layer of selection logic is applied simultaneously, similar to a manner in which row, column, and table attributes can be used in a database to select a particular record.

FIG. 6 illustrates an access control policy structure for a register protection unit (RPU). The RPU's access control policy structure 224 is similar to the PPU's access control policy structure 200 except that register regions 226 take the place of the PPU's memory regions 180. In some embodiments, the RPU 158 also protection at a bit-level granularity. One particular application is to a peripheral that controls the general purpose IO (GPIO). Typically, such a peripheral will have 32-bit registers, and each such register may pertain to some number of IO pins. The RPU then defines a plurality of access control policies that containerize the individual pins for a given HW sub-context.

FIG. 7 illustrates components of a memory access request 160, including a hardware context 196 field or set of bus signals, a security attributes 194 field or set of bus signals, and a target memory location 192 field or set of bus signals. In one embodiment, one or more of the memory access request components 196, 194, 192 are encapsulated within a data packet sent over the bus 104. In another embodiment, one or more of the memory access request 160 components 196, 194, and 192 are carried on the system bus 104 and through the bus interconnect 108.

Figure 8:
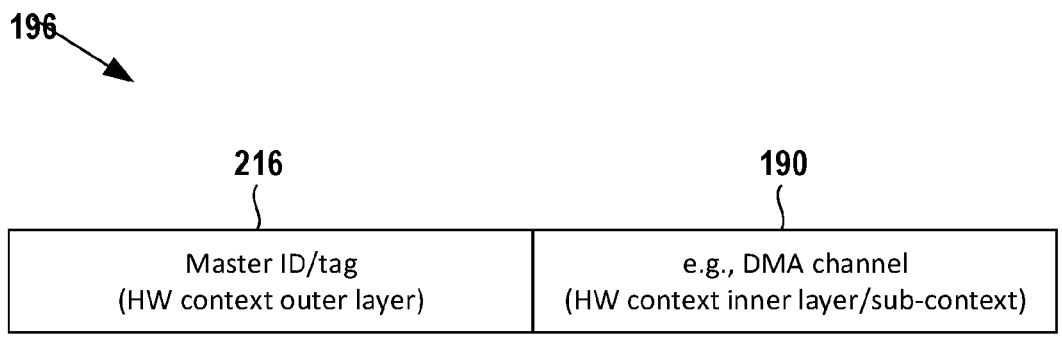
FIG. 8 is a block diagram detailing aspects of a hardware context according to one embodiment of the invention.

FIG. 8 is a block diagram detailing aspects of a hardware context 196 according to one embodiment of the invention. At a minimum, the hardware context 196 relates to the master device 106 (e.g., the CPU 102, the DMA controller 110, etc.) that initiated the memory access request 160. According to one implementation, the hardware context 196 comprises a master ID or tag 216.

The master ID/tag 216 may be characterized as providing only an outer layer of the hardware context 196. Under this characterization, the hardware context 196 would also include an inner layer or hardware sub-context 186. According to one implementation, this inner layer is identified using a sub-context identifier 190, such as a DMA channel 120.

Figure 9:
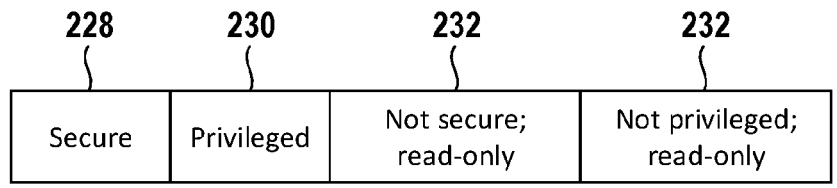
FIG. 9 is a block diagram illustrating one embodiment of a security attribute structure.

FIG. 9 illustrates one embodiment of a security attribute structure 194 comprising a secure field 228, a privileged field 230, a not-secure-but-read-only field 232, and a not-privileged-but-read-only field 232. Many different security structures and architectures are possible, of course. As noted earlier, a security attribute 194 can be any attribute associated with a memory access request 160 used to control access to a targeted memory region 180.

Figure 10:
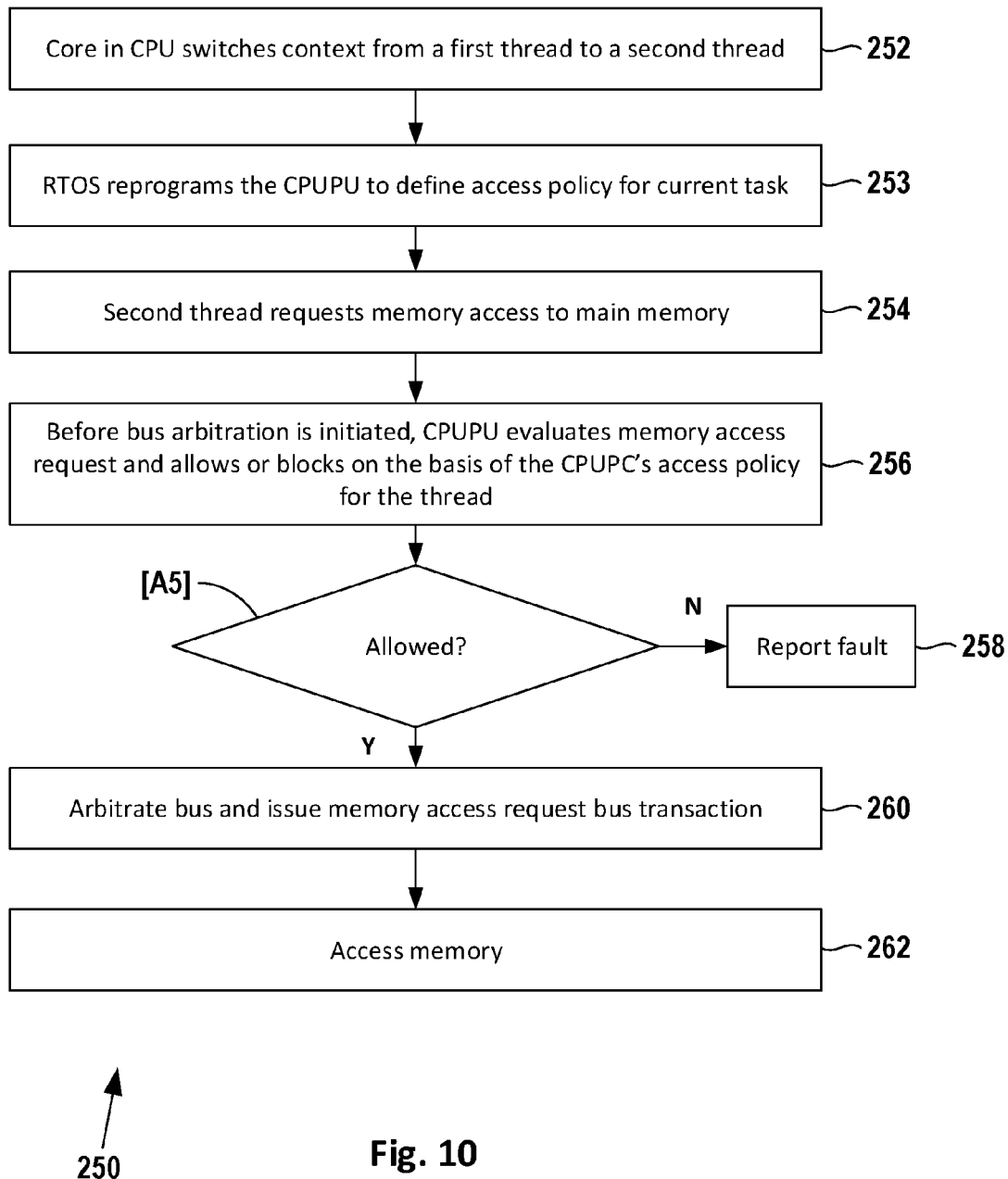
FIG. 10 is a flow chart illustrating a gatekeeping procedure for access requests from a CPU thread to main memory.

FIG. 10 is a flow chart 250 of one embodiment of a gatekeeping procedure for handling access requests 160 from a CPU thread to main memory 112. In block 252, a core or virtual core within a CPU 102 switches from a first thread to a second thread. This switch changes the software context. In block 253, in response to the software context switch, the RTOS identifies or selects the access control policy 166 appropriate for that particular thread, and reprograms the CPUPU 150 to use it. Some time while the second thread is running (block 254), it requests memory access to main memory 112. In block 256, and before any bus arbitration is initiated, the CPUPU 150 administers the access control policy 166 to allow or block the memory access request 160. If the CPUPU 150 blocks the request 160, then in block 258, it reports a fault, which is then handled by the RTOS. If the CPUPU 150 allows the request 160, then in block 260 the CPU 102 arbitrates for access to the system bus 104 and issues the memory access request 160 to the bus 104. Main memory 112 does not have its own dedicated PU to apply a second level of gatekeeping on the memory access request 160. In block 262, the memory 112 is accessed.

Figure 11:
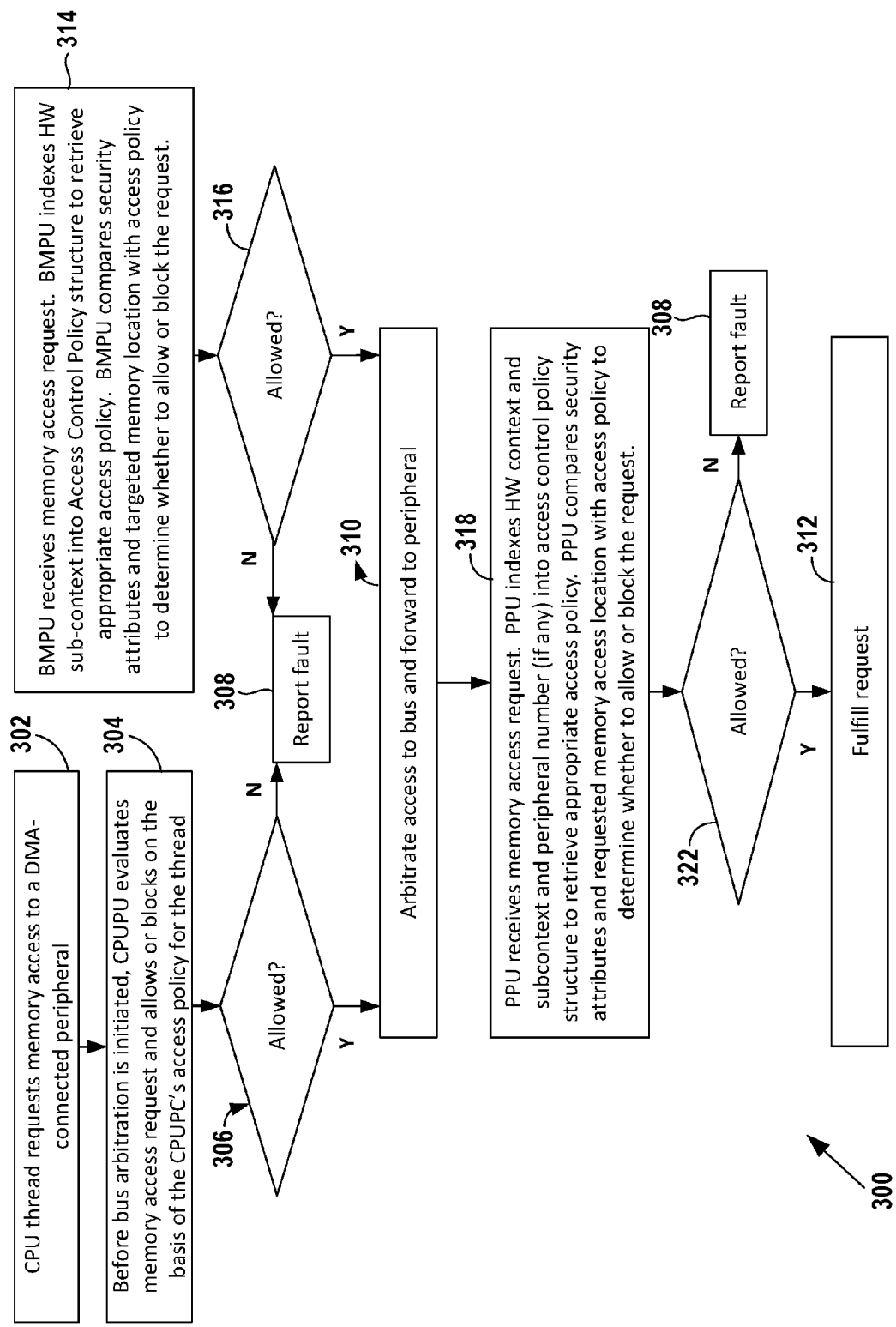
FIG. 11 is a flow chart illustrating a gatekeeping procedure for access requests from a CPU thread or direct memory access (DMA) channel to a peripheral.

FIG. 11 is a flow chart 300 of one embodiment of a gatekeeping procedure for handling access requests 160 from a CPU thread or direct memory access (DMA) channel 120 to a peripheral 114. In block 302, a CPU thread requests memory access to a DMA-connected peripheral. Flow proceeds to block 304. Before bus arbitration is initiated, the CPUPU 150 administers the access control policy 168 appropriate to the thread that issued the request 160 to allow or block the request 160. In accordance with block 306, if the CPUPU 150 blocked the request, then in block 308 it reports a fault. If the CPUPU 150 allowed the request, then flow proceeds to block 310.

Before describing blocks 310-312, attention is directed to an independent memory access request 160 coming from a BMPU 152. It should be noted that the flowchart 300 is not intended to suggest that the actions in both blocks 302 and 314 are related or that both need to happen. Using one flowchart 300 to show the handling of memory access requests 160 originating from either the CPU 102 or another bus master 106 is intended to be a succinct way of illustrating how similar chains of events follow both types of requests 160.

In block 314, a BMPU 152 receives a memory access request 160 from the CPU 102 or other hardware subsystem. The BMPU 152 indexes the hardware sub-context 186—for example, the DMA channel identifier 190—into the BMPU's access control policy structure 184 to select or retrieve or select an appropriate access policy 188. There is no need to index the master ID/tag 216, because it is implicitly associated with the BMPU 152, which only stores access control policies 184 pertinent to the bus master 106 to which it is connected.

The BMPU 152 compares the security attributes 194 and targeted memory location with access policy configuration information stored in the access control policy 188 to determine whether to allow or block the request 160. If the PPU 154 will be the ultimate arbiter of whether to allow or block the request 160, then the region of memory pertaining to the peripheral 114 is marked as un-checked (i.e., no imposed security restrictions) for that particular hardware sub-context 186. Accordingly, the access request 160 passes through.

In accordance with block 316, if the BMPU 152 blocked the request, then in block 308 it reports a fault. If the BMPU 152 allowed the request, then flow proceeds to block 310. Turning now to blocks 310-312, in block 310 the relevant bus master 106 or CPU 102 arbitrates access to the bus 104 and dispatches a request 160 to the peripheral 114. In block 318, the request 160 is picked up by the PPU 154, which indexes the hardware context 196 (including the hardware sub-context 186, if any) and peripheral number 222 into its access control policy structure 200 to select or retrieve or select the appropriate peripheral access policy 206.

It is noteworthy that the PPU 154 does not need to be able to ascertain the actual peripheral 114, CPU core or thread, or other source of the memory access request 160 associated with the hardware context 196. For example, the processor 100 may reassign (bind) the binary values associated with the hardware context 196 to another hardware resource. The processor 100 could also reassign or bind a peripheral number 222 to a different peripheral 114. The PPU 154 is agnostic about such bindings, relying instead on the hardware context 196 (including hardware sub-context 186, if any) and peripheral number 222 to select or retrieve an appropriate access control policy 206. The RTOS, on the other hand, tracks the relationship between the hardware context 196 (including hardware sub-context 186, if any) and the associated hardware resource, and between the peripheral number 222 and the peripheral 114.

Because the PPU 154 is agnostic about any software thread associated with the CPU hardware context 196, every time that there is a software task switch, the CPU 102 updates the access control policy 320 associated with the CPU hardware context 196 at the PPU 154 to match the thread. For example, just before the RTOS thread, which runs as a secure entity, becomes inactive, the CPU 102 updates the access control policy 320 of the PPUs 154 and RPUs 158 associated with the CPU hardware context 196 to reflect the desired access control policies for the non-secure user thread.

In block 322, after retrieving or selecting the access control policy 206, the PPU 154 compares the request's security attributes 194 and targeted memory location with access policy configuration information in the access control policy 206 to determine whether to allow or block the request 160. In accordance with block 322, if the PPU 154 blocked the request, then in block 308 it reports a fault. If the PPU 154 allowed the request, then flow proceeds to block 312, where the request if fulfilled.

Figure 12:
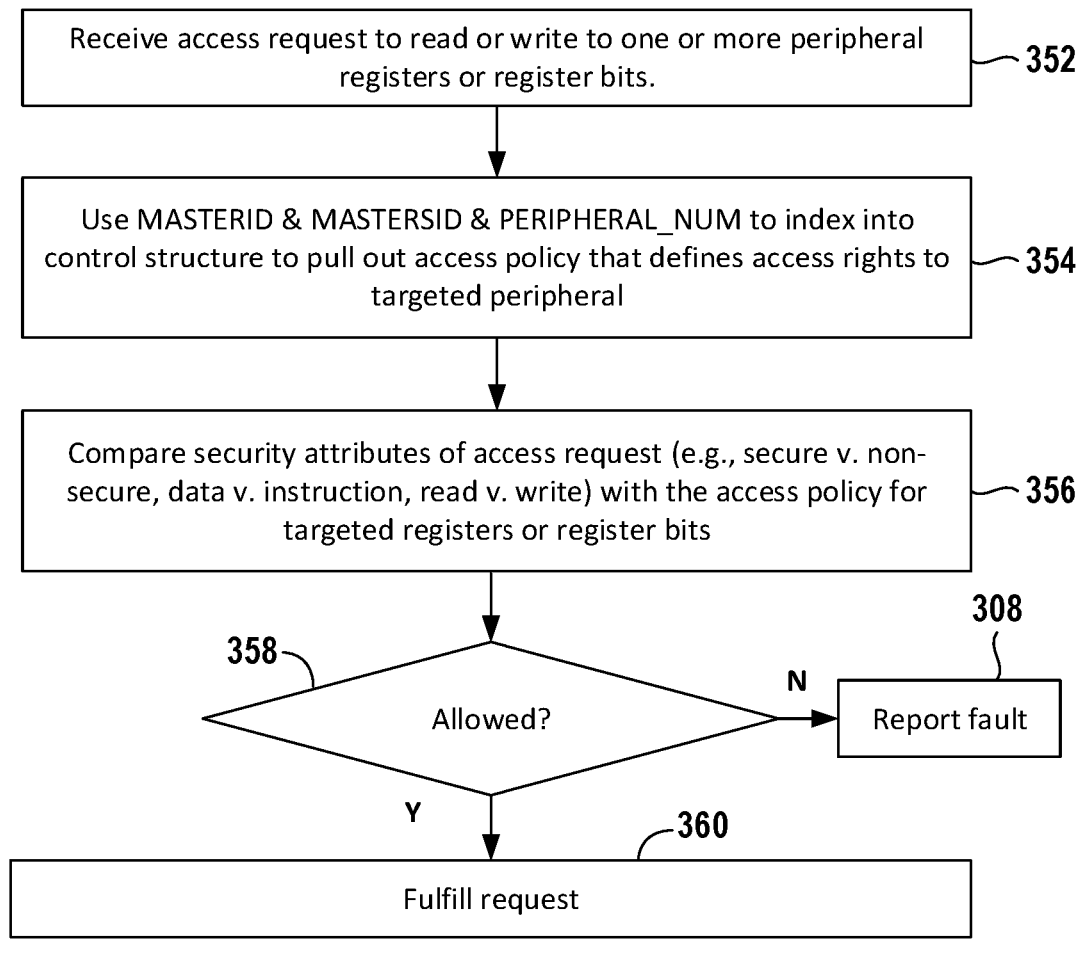
FIG. 12 is a flow chart illustrating a gatekeeping procedure for access requests to a peripheral, from the perspective of a PPU.

FIG. 12 is a flow chart 350 illustrating a gatekeeping procedure for access requests 160 to a peripheral 114 from the perspective of a PPU 154 or RPU 158. In block 352, the PPU 154 or RPU 158 receives a request 160 to read or write to one or more peripheral 114 registers or register bits. In block 354, the PPU 154—if the PPU 154 is applying the gatekeeping procedure 350—uses the MASTERID 216, MASTERSID 190, and PERIPHERAL_NUM 222 identifiers to index into its access control policy structure 200 to select or retrieve the appropriate access control policy 320 that defines access rights to the targeted peripheral 114. Alternatively, the RPU 158—if the RPU 154 is applying the gatekeeping procedure 350—uses the MASTERID 216 and MASTERSID 190 identifiers (but not the PERIPHERAL_NUM 222, because the peripheral's scope is itself, not also the other peripherals) to index into its access control policy structure 200 to select or retrieve the appropriate access control policy 320 for that peripheral 114.

In block 356, the PPU 154 or RPU 158 compares characteristics (herein referred to as "security attributes") of the access request 160 (e.g., secure v. non-secure, data v. instruction, read v. write) with the access restrictions provided by the access control policy 320 for the registers or register bits targeted by the access request 160. If in block 358 and on the basis of that comparison, the access request 160 is allowed, then in block 360, the access request 160 is fulfilled. Otherwise, in block 308, the PPU 154 or RPU 158 reports a fault.

Figure 13:
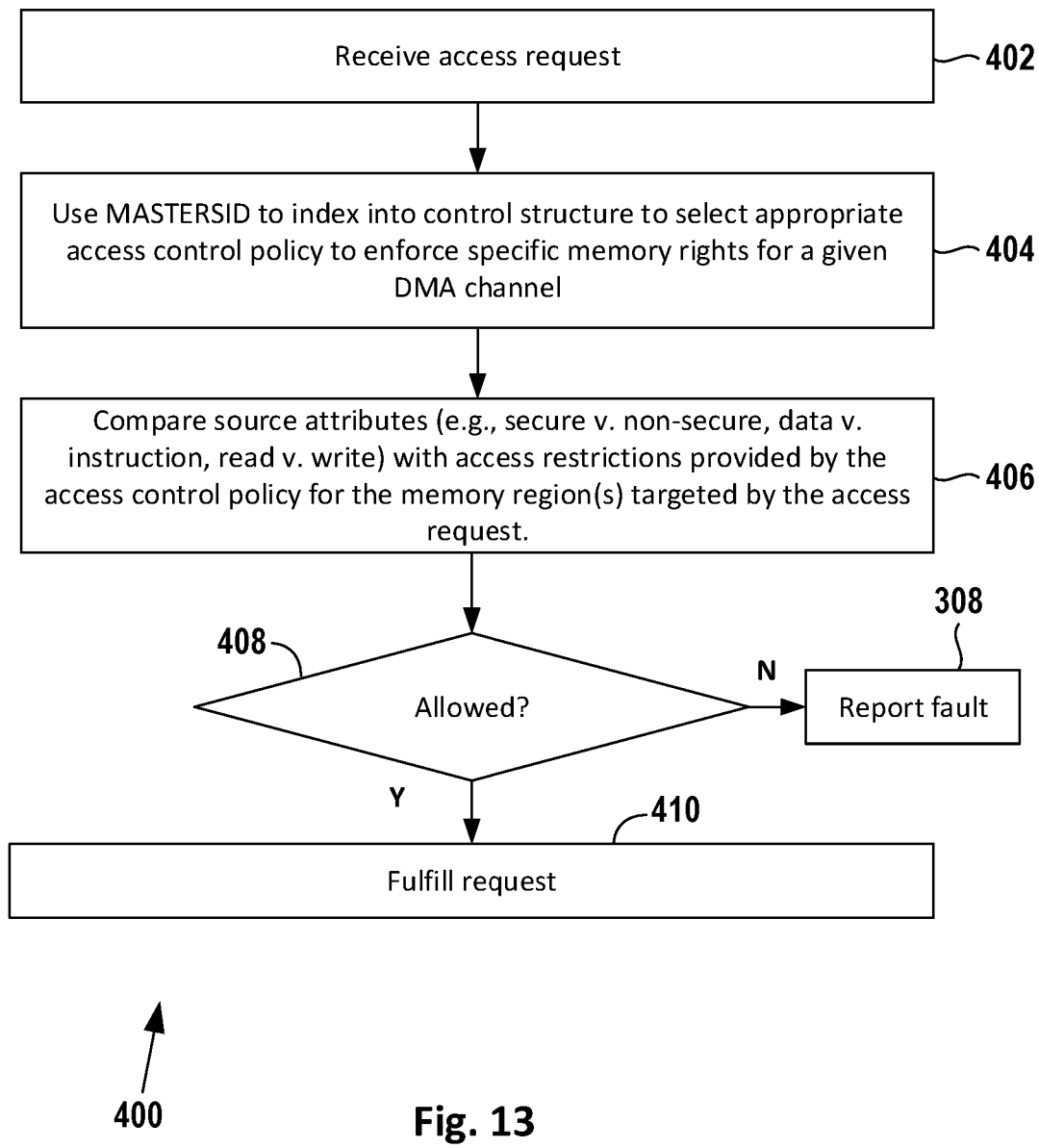
FIG. 13 is a flow chart illustrating a gatekeeping procedure for access requests to a peripheral, from the perspective of a BMPU.

FIG. 13 is a flow chart 400 illustrating a gatekeeping procedure for access requests 160 to a peripheral 114, from the perspective of a BMPU 152. In block 402, the BMPU 152 receives an access request 160. In block 404, the BMPU 152 uses the MASTERID 190 identifier to index into its access control policy structure 184 to select or retrieve the access control policy 188 to enforce over a given DMA channel 120. In block 406, the BMPU 152 compares the source attributes (e.g., secure v. non-secure, data v. instruction, read v. write) with the access restrictions provided by the access control policy 188 for the memory region(s) targeted by the access request 160. If in block 408 and on the basis of that comparison, the access request 160 is allowed, then in block 410, the access request 160 is fulfilled. Otherwise, in block 308, the PPU 154 reports a fault.

Figure 14:
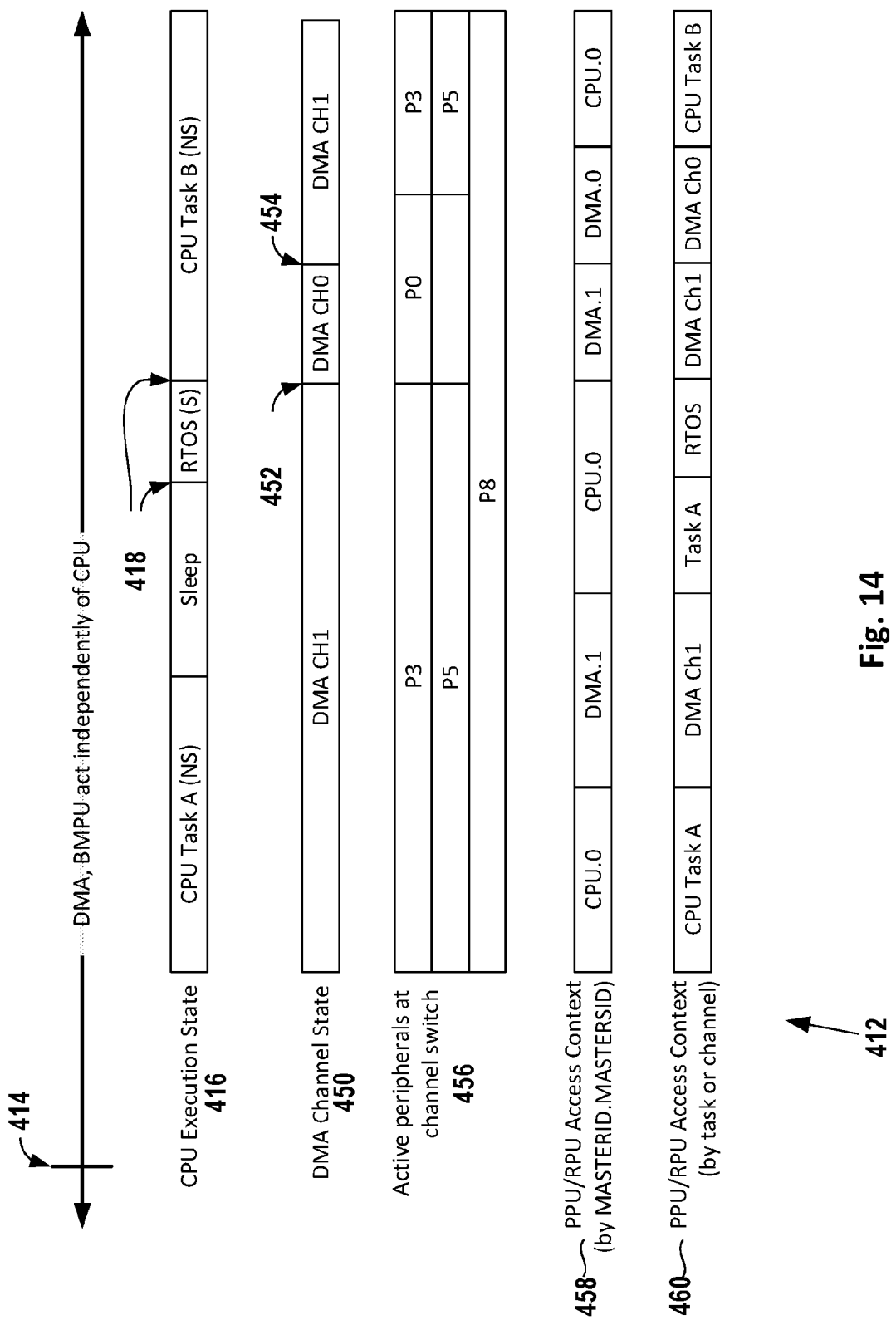
FIG. 14 is a timing diagram illustrating an interplay of executive states, DMA states, and PPU access contexts.

FIG. 14 is a timing diagram 412 illustrating an interplay of executive states, DMA states, and PPU access contexts. The top row illustrates an early point in time 414 at which the CPU 102 preprograms a DMA controller 110 and a BMPU 152 via the SMU 162. Subsequently, the DMA controller 110 is configured to serve DMA requests autonomously, independently of and without the intervention of the CPU 102. Likewise, the BMPU 152 is configured to administer the access control policies 184 autonomously, independently of and without the intervention of the CPU 102. An arbitration and scheduling mechanism, which may prioritize some DMA requests over others, determines which DMA channel 120 is active at any given time. The arbitration and scheduling mechanism also acts autonomously of the CPU 102 after being preprogrammed by the CPU 102.

The second row illustrates the CPU execution state 416 as the CPU 102 transitions from a first non-secure (NS) Task A, to a sleep state, to a secure (S) RTOS-active state, to a second non-secure (NS) Task B. Task A has access rights to a subset of memories and peripherals. It also has access to DMA configuration registers related to DMA channel 0. DMA channel 0 likewise has access to the same subset of memories and peripherals as Task A. Task B has access rights to another subset of memories and peripherals and to DMA configuration registers related to DMA channel 1. DMA channel 1 likewise has access to the same subset of memories and peripherals as Task B. The RTOS has access rights to all of the memories, peripherals, as well as the DMA configuration registers of all of the DMA channels 120. Each time 418 a task switch occurs, the CPU 102 configures the SMU 162 to update the CPUPU 150, any PPUs 154, and any RPUs 158 with access control policies that are appropriate for that task.

The third row illustrates the asynchronous operation of the CPU 102 and DMA controller 110 by showing a DMA channel state 450 that is independent of the CPU execution state 416. For example, DMA channel 1 is shown as being active while Task A is active, while the CPU 102 is asleep, and while a RTOS thread is active. The active status of channel 1 while the CPU 102 is asleep illustrates how the DMA's hardware contexts 196 can remain active even when the CPU 102 is in a low-power inactive state.

A DMA channel switch 452 to channel 0—driven by the arbitration and scheduling mechanism discussed above—is shown occurring at the same time as the CPU execution state 450 switches to Task B. Another DMA channel switch 454, also driven by the above-discussed arbitration and scheduling mechanism, and this time back to channel 1, occurs while Task B continues to run. These switches occur autonomously of the CPU 102 and in accordance with the DMA controller's 110 arbitration and scheduling mechanism.

The fourth row (itself a set of rows) is an exemplary illustration of peripherals 456 that are configured to be accessible to different channels 120. In this particular illustration, peripherals P3, P5 and P8 are shown as being accessible when DMA channel 1 is active, whereas only peripherals P0 and P8 are shown as being accessible when DMA channel 0 is active. The fourth row shows the how the set of accessible peripherals 456 changes with each DMA channel switch.

The fifth row illustrates the PPU/RPU access context 458 according to the hardware context 196, including hardware sub-context 186, illustrated in the form of MASTERID 216 "dot" MASTERSID 190. This row illustrates that the access context 458 at a memory mapped peripheral 114 can switch between the CPU 102 and various DMA channels 120 at arbitrary times asynchronous to the processor 100. The DMA controller 110, moreover, may require access to the same peripherals 114 as Task A. Furthermore, a CPU task, e.g., Task A, can schedule its own DMA operations, and ahead of time, so that the DMA operations are carried out after Task A is no longer running. Notably, the PPU 154 or RPU 158 is only aware of the MASTERID 216 and MASTERSID 190 numerical encodings, not which task or channel is associated with those identifiers.

The sixth row illustrates the PPU/RPU access context 460 by the task or particular channel associated with those hardware contexts 196. Because the RTOS is in full control of which user task context is active and can update the processor 100 and system PUs accordingly for each switch, it may only require a single HW context resource 196 at any given PU, and times of its choosing bind different software contexts to that resource. For example, at the beginning of the row, CPU Task A is associated with the CPU.0 hardware context identifier. Later, while the CPU 102 is asleep, CPU Task A is still associated with the CPU.0 hardware context identifier, even though Task A has already completed. As indicated above in the discussion of the fifth row, it is possible for CPU Task A to have invoked a later-presented access request through a DMA operation. This further illustrates how the access contexts of a DMA-connected peripheral 114 may be asynchronous with the CPU task state. When the RTOS becomes active, the RTOS becomes associated with the CPU.0 hardware context identifier. Later, CPU Task B becomes associated with the CPU.0 hardware context identifier.

While FIG. 14 illustrates a simplified timeline for a single-core, single-threaded processor 100, the invention is applicable to embodiments embracing more complex architectures. In a multi-core or multi-threaded processor 100, each core or virtual core has its own task context. As the cores and other hardware subsystems invoke transactions with peripherals 114, those transactions are funneled on the peripheral bus 116. When the transactions get to the peripheral bus 116, they are serialized, just as they are with a single-core, single-threaded processor 100 (unless the peripheral bus 116 provides a multi-port memory). Even if multi-port, each port takes only one transaction at time, so in both simple and complex architectures, an arbitration mechanism may be provided to present them in order. Advantageously, this serialization process enables the PPU 154 to switch out whatever access policy any given core has, and each core can reprogram its own soft context or task context as well, as it switches. In a processor 100 with multiple peripheral sub-systems, each having its own PPU 154, access to the PPUs 154 can happen in parallel. In such a case, each peripheral sub-system serializes the transactions independently of each other peripheral sub-system; and each PPU 154 implements access control for its peripheral subsystem independently of each other PPU 154.

It will be noted that while peripherals 114 are commonly configured as bus slaves, some peripherals 114 are configured as bus masters 106, and some types of peripherals 114 are bus masters 106 with slave ports. The invention is applicable to all of these configurations. In the case of a peripheral 114 configured as a bus master 106 but having a slave port, a BMPU 152 controls access to memory access requests 160 generated by the peripheral 114, and a PPU 154 at the peripheral's slave port police's memory access requests 160 attempting to access the peripheral 114.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A processor comprising:
a central processing unit (CPU);
system memory external to the CPU;
a plurality of hardware subsystems, other than the CPU, capable of dispatching a memory access request;
a system bus connecting the CPU to the system memory, the system bus configured to deliver memory access requests between various hardware subsystems of the processor, wherein a memory access request includes or is accompanied by a hardware context identifier identifying a hardware subsystem that dispatched the memory access request; and
a programmable memory-addressable protection unit (PU) external to the CPU and configured to administer a plurality of hardware-context and/or subcontext-specific access control policies to memory access requests independently of the CPU;
wherein the PU is configured to use the hardware context and/or subcontext identifier to select an appropriate access control policy to allow or block a memory access request in accordance with the selected access control policy;
wherein the PU is dedicated to a DMA controller, the PU is configured to administer different access control policies for different DMA channels, and the PU is configured to use a DMA channel number to select the access control policy corresponding to the DMA channel number.

2. The processor of claim 1, wherein the PU is operable to administer a plurality of hardware-context and/or subcontext-specific access control policies to memory access requests while the CPU is asleep and without waking up.

3. The processor of claim 1, wherein:
the access control policy defines access criteria for one or more memory regions;
the memory access request identifies a target memory location; and
the PU is configured to compare the target memory location with a corresponding one of the memory regions to determine whether to allow or block the memory access request.

4. The processor of claim 1, wherein the memory access request includes or is accompanied on the system bus by one or more security attributes defining a security level and/or privilege level of the memory access request.

5. The processor of claim 1, further comprising signal lines in the system bus configured to carry the hardware context and/or sub-context identifier.

6. The processor of claim 1, wherein the PU is dedicated to a peripheral bus bridge.

7. A processor comprising:
a central processing unit (CPU);
system memory external to the CPU;
a plurality of hardware subsystems, other than the CPU, capable of dispatching a memory access request;
a system bus connecting the CPU to the system memory, the system bus configured to deliver memory access requests between various hardware subsystems of the processor, wherein a memory access request includes or is accompanied by a hardware context identifier identifying a hardware subsystem that dispatched the memory access request; and
first and second programmable memory-addressable protection units (PUs), each PU being external to the CPU and configured to administer a plurality of hardware-related access control policies to memory access requests independently of the CPU and while the CPU is asleep and without waking the CPU up;
wherein:
the first PU is dedicated to a system bus master that dispatches memory access requests to system memory and memory-mapped peripherals; and
the second PU is dedicated to one or more peripherals that receive memory access requests;
the first and second PUs apply relatively coarse and fine-grained access control policies, respectively and in respect to one another, to memory access requests directed to the one or more peripherals; and
the PU is configured to use the hardware context and/or subcontext identifier to select an appropriate access control policy to allow or block a memory access request in accordance with the selected access control policy.

8. A method of securely handling memory access requests in a processor with a central processing unit (CPU), system memory external to the CPU, a system bus, a plurality of hardware subsystems, other than the CPU, capable of dispatching a memory access request, and a programmable memory-addressable protection unit (PU), the method comprising:
the hardware subsystems dispatching memory access requests onto the system bus, wherein a memory access request includes or is accompanied by a hardware context identifier identifying which unit is originating the memory access request; and the PU using the hardware context identifier to select a hardware context and/or sub-context-specific access control policy; and the PU allowing or blocking memory access requests in accordance with the selected access control policy;

wherein the PU is dedicated to a DMA controller and the PU administers different access control policies for different DMA channels, the method further comprising the PU using a DMA channel number to select an access control policy corresponding to the DMA channel number.

9. The method of claim 8, further comprising administering a plurality of hardware-context and/or subcontext-specific access control policies to memory access requests while the CPU is asleep and without waking up.

10. The method of claim 8, further comprising:

the access control policy defining access criteria for one or more memory regions;

the memory access request identifying a target memory location; and the PU comparing the target memory location with a corresponding one of the memory regions to determine whether to allow or block the memory access request.

11. The method of claim 8, further comprising asserting one or more signal lines on the system bus to indicate a security level and/or privilege level of the memory access request.

12. The method of claim 8, further comprising asserting a plurality of signal lines on the system bus to identify the hardware context and/or sub-context associated with the memory access request.

13. The method of claim 8, wherein the PU is dedicated to a peripheral bus bridge.

\* \* \* \* \*